May 14, 1935. G. J. STANLEY 2,001,319

CABLE

Filed April 28, 1932

INVENTOR
George J. Stanley
By W. D. Keith
His Attorney

Patented May 14, 1935

2,001,319

UNITED STATES PATENT OFFICE 2,001,319

CABLE

George J. Stanley, Pittsburgh, Pa., assignor to Aluminum Company of America, Pittsburgh, Pa., a corporation of Pennsylvania Application April 28, 1932, Serial No. 608,038

3 Claims. (Cl. 173—13)

The invention relates to protective sheathing for wire or cable, finding particular application in preventing corrosion of steel cable such as steel messenger cable or the steel-reinforcing strands of conductor cable.

It is an object of my invention to provide a composite cable characterized by high tensile strength together with good electrical conductivity and high corrosion resistance. Another object is to provide a cable with a protective conducting sheathing which is light in weight, relatively thin, and which can be quickly and easily applied.

It is a well-known fact that messenger cable and ground wires for overhead transmission lines, being subjected in use to the weathering action of the elements, become corroded and as time goes on become weakened and less suited to the purposes they are intended to serve. What attempts have been made to correct this condition by protecting the wire or cable against corrosion have not been attended with any appreciable degree of success. The practical failure of these attempts may be ascribed to various causes, but it is believed to be chiefly due to one or both of two things; namely, failure to provide a protective sheathing which is really effective in service or the failure to devise a sheathing which is easy to apply and which could be provided at a sufficiently low cost to find general application.

It is, therefore, a particular object of my invention to provide a cable having a protective sheathing which overcomes the aforementioned difficulties and which in addition possesses many advantages which are not to be obtained in the cable structures heretofore known or used.

A specific object of my invention is to provide a cable comprising a steel core of high tensile strength, protected by a thin corrosion-resistant conducting sheathing of metallic foil. Further objects and advantages will appear in connection with the description of the drawing, in which.

Figure 1:
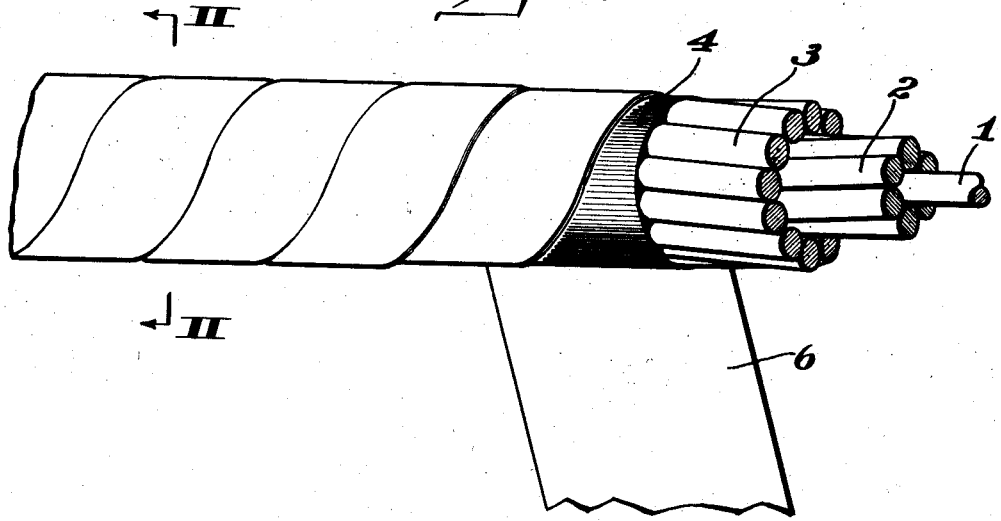
Fig. 1 is a view of a section of cable embodying my invention, illustrating the method of applying a protective sheathing thereto.
Figure 2:
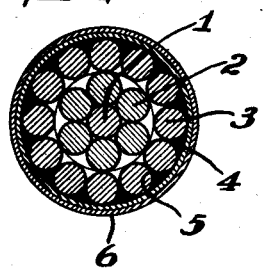
Fig. 2 is a transverse section taken on the lines II—II of Fig. 1.

In the embodiment illustrated in Figs. 1 and 2, the application of a thin metallic foil sheathing to a multistrand steel cable is disclosed. The cable is built up of a plurality of layers of spirally wound strands, the successive layers being indicated by the reference numerals 1, 2 and 3. In the form of cable which I have chosen for purposes of illustration the "concentric" system of stranding is shown. The successive layers are spiralled in opposite directions, as is clearly shown in Fig. 1. Over the outer layer of strands and covering all exposed surfaces of the steel cable there is applied a coating 4 of bitumastic cement, asphalt, or other suitable plastic cementitious material possessed of the requisite corrosion-resistant and adhesive properties. This coating may be painted on the cable or applied in any convenient manner, but is preferably applied in such a way that it will fill the interstices between the strands as indicated at 5 in Fig. 2.

A strip of foil 6, preferably aluminum foil, is spirally wound over the coated cable so as to form a continuous unbroken foil sheath. I prefer to use for this purpose aluminum foil, although if desired, tin foil or other corrosion-resistant foil may be employed.

The term "foil" as used throughout this specification, and in the claims, is employed in its ordinary commercial sense as referring to very thin sheet metal having a maximum thickness of about 0.006 of an inch. Metal of this thickness is pliable enough to conform to surface irregularities of the cable or of the adhesive coating and form a closely adhering sheath.

When the foil is wrapped around a cable in such a way that successive turns of the foil are arranged to lie in overlapping relationship, as indicated in Fig. 1, there is very little if any opportunity for moisture to penetrate the sheathing so formed. It will, of course, be understood that the adhesive employed may be extended between the overlapped portions of the foil if so desired. I prefer to lap the foil for a distance approximately equal to one-half of the width of the strip so that, in effect, a continuous double sheathing of foil will result, as shown in Fig. 2. A particular feature of this construction is that the thin metallic foil, being soft and pliable, readily adapts itself to the surface irregularities and results in a smooth surface which is not appreciably broken at the point of overlap. It has been proposed heretofore to apply a spiral winding of relatively non-corrosive metal over a steel core, the strip being preformed so that its forward edge is offset inwardly from the rearward edge, which is applied in such a manner that the covering is composed of two layers of strips throughout its length. There are two principal disadvantages to such a construction. In the first place it is necessary that the relatively heavy strips be preformed; that is, subjected to a forming operation prior to application to the cable. Secondly, the successive turns of the strip, being unsecured to each other and unsecured to the core as is necessary to permit free flexing of the cable, it is impossible to utilize a corrosion-resistant undercoating such as the adhesive 4 of the present invention.

It may be desired to provide the steel strands of the cable with a zinc coating, as by means of the usual galvanizing operation, but this is not believed to be essential to the realization of the benefits conferred by my invention.

Figure 3:
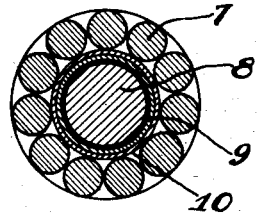
Fig. 3 is a similar transverse section through a modified form of cable embodying the invention.

In Fig. 3 there is shown a modified form of the invention in which the composite sheathing of adhesive material and metallic foil is applied between the strands of a composite cable consisting of a layer of conductor wires 7 and a central reinforcing steel wire 8. This steel core wire 8, which may be galvanized if desired, is provided with a corrosion-resistant adhesive coating 9 over which is spirally wound metallic foil 10 which is preferably formed of the same metal as the conductor wires 7.

Thus, in the case of steel-reinforced aluminum cable, aluminum foil would be used, effectively preventing electrolytic action between the foil and the conductor strands. Because moisture cannot readily penetrate the protective sheathing, electrolytic action is also prevented between the foil sheathing and the steel core. It will be readily apparent that the protective sheathing 9, 10 can be applied over the exterior of the conductor strands 7 instead of, or as well as, between the conductor strands 7 and the core 8.

Figure 4:
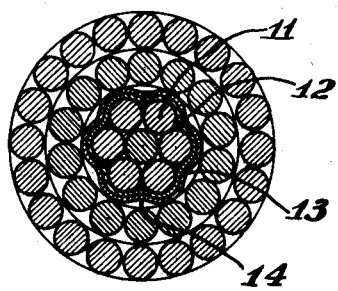
Fig. 4 is a transverse section through a cable illustrating a further embodiment.

The further embodiment shown in Fig. 4 is intended to illustrate the application of my invention to steel-reinforced aluminum cable in which the core consists of a plurality of steel strands of wire 11. The bitumastic cement or other adhesive 12 is applied over the surface of the core, filling the interstices between the strands. The double layer of aluminum foil 13 formed by the overlapping spiral winding disclosed in Fig. 1 has been slightly depressed between the adjacent strands 11 of the core, as indicated at 14. The adaptability of the pliable aluminum foil to the irregularities of the surface of the core when the interstices are only partially filled with the adhesive results in an economy in adhesive and decreases the weight of the cable so formed. The importance of this may be readily understood when it is considered that steel-reinforced aluminum cable is used for transmission lines having relatively few points of support and very long span lengths, where even a very small saving in weight per lineal foot may amount to a very considerable saving in gross weight. Furthermore, the pliable nature of the foil insures better adhesion and less possibility for the penetration of moisture or other corrosive agents.

While I have described my invention chiefly in connection with its application to steel messenger cable or ground wires and to steel-reinforced aluminum cable, it will be understood that these embodiments have been selected solely for the purpose of illustration and that other embodiments may be found which fall within the purview of the invention as defined in the appended claims. For example, it would find application to reinforced copper cables. A steel core, whether galvanized or not, is not satisfactory if directly in contact with copper strands. If the core is galvanized, the zinc coating is rapidly destroyed by electrolytic action. It has therefore been necessary heretofore to employ either copper-weld wires, or bronze, in place of steel. By the use of my invention, however, it is possible to use steel reinforcing wires for copper cable, with a protective sheathing of bitumastic cement or other adhesive and copper foil applied over the steel core of the cable.

The foil sheathing, being itself a good conductor of electricity, contributes to the effectiveness of the cable when used as an electrical conductor.

While in describing my invention I have in the interest of clarity employed specific language, I have no intention in the use of such language of excluding any equivalents or minor variations of the invention set forth.

I claim:

1. As an article of manufacture, a cable comprising a steel core covered with a spirally wound strip of aluminum foil adhesively secured to said steel core, and a plurality of aluminum conductors overlying the aluminum foil winding.

2. As an article of manufacture, a cable comprising a steel core and a protective sheathing consisting of an adhesive which is impervious to moisture, and aluminum foil, said steel core consisting of a plurality of strands of wire the interstices of which are partially filled with said adhesive, said aluminum foil overlying the wire strands of the core and conforming with the irregularities of said partially filled interstices.

3. As an article of manufacture, a cable comprising a steel core and a protective sheathing consisting of an adhesive which is impervious to moisture, and metallic foil, said steel core consisting of a plurality of strands of wire the interstices of which are partially filled with said adhesive, said metallic foil overlying the wire strands of the core and conforming with the irregularities of said partially filled interstices, and a plurality of wire strands of high electrical conductivity overlying said protective sheathing.

GEORGE J. STANLEY.